United States Patent
Pan et al.

(10) Patent No.: US 8,148,015 B2
(45) Date of Patent: Apr. 3, 2012

(54) CATHODE MATERIALS FOR LITHIUM BATTERIES

(75) Inventors: Fuzhong Pan, Shenzhen (CN); Xi Shen, Shenzhen (CN); Caimin Wan, Shenzhen (CN); Shengping You, Shenzhen (CN)

(73) Assignee: BYD Company Limited (CN)

( * ) Notice: Subject to any disclaimer, the term of this patent is extended or adjusted under 35 U.S.C. 154(b) by 822 days.

(21) Appl. No.: 12/053,308

(22) Filed: Mar. 21, 2008

(65) Prior Publication Data

US 2010/0062339 A1    Mar. 11, 2010

(51) Int. Cl.
  H01M 4/58  (2010.01)
(52) U.S. Cl. ........ 429/231.1; 429/231.3; 429/231.5; 429/231.6; 429/218.1; 429/232; 429/217; 429/231.95; 252/182.1; 252/500
(58) Field of Classification Search ........ 429/231.1, 429/231.3, 231.5, 231.6, 218.1, 232, 217, 429/231.95; 252/182.1, 500
  See application file for complete search history.

(56) References Cited

U.S. PATENT DOCUMENTS

| | | | |
|---|---|---|---|
| 3,778,307 A | 12/1973 | Beer et al. | |
| 4,394,280 A | 7/1983 | von Alpen et al. | |
| 5,910,382 A | 6/1999 | Goodenough et al. | |
| 6,514,640 B1 | 2/2003 | Armand et al. | |
| 6,558,844 B2 | 5/2003 | Howard, Jr. et al. | |
| 6,645,452 B1 | 11/2003 | Barker et al. | |
| 6,702,961 B2 | 3/2004 | Barker et al. | |
| 6,835,500 B2 | 12/2004 | Masquelier et al. | |
| 6,960,331 B2 | 11/2005 | Barker et al. | |
| 6,964,830 B2 | 11/2005 | Takahashi | |
| 7,025,907 B2 | 4/2006 | Kohzaki et al. | |
| 7,172,834 B1 | 2/2007 | Jow et al. | |
| 7,189,475 B2 | 3/2007 | Sasaki et al. | |
| 7,255,965 B2 | 8/2007 | Xu et al. | |
| 7,261,979 B2 | 8/2007 | Gozdz et al. | |
| 7,338,734 B2 | 3/2008 | Chiang et al. | |
| 7,722,848 B2 | 5/2010 | Dai et al. | |
| 2002/0047112 A1 | 4/2002 | Hosoya et al. | |
| 2002/0102459 A1 | 8/2002 | Hosoya et al. | |
| 2002/0182497 A1 | 12/2002 | Kohzaki et al. | |
| 2004/0096743 A1* | 5/2004 | Okae et al. .......... | 429/231.1 |
| 2004/0151649 A1 | 8/2004 | Hemmer et al. | |
| 2006/0083990 A1 | 4/2006 | Adamson et al. | |
| 2006/0236528 A1 | 10/2006 | Xu et al. | |
| 2007/0160752 A1 | 7/2007 | Mao | |
| 2007/0166609 A1 | 7/2007 | Lee et al. | |
| 2007/0178370 A1 | 8/2007 | Amine et al. | |
| 2007/0184352 A1 | 8/2007 | Donoue et al. | |
| 2007/0207080 A1 | 9/2007 | Yang | |
| 2007/0212606 A1 | 9/2007 | Chang | |
| 2009/0081102 A1 | 3/2009 | Dai | |
| 2009/0106970 A1 | 4/2009 | Fan | |
| 2009/0148765 A1 | 6/2009 | Cao et al. | |
| 2009/0169984 A1 | 7/2009 | Liang et al. | |
| 2009/0191455 A1 | 7/2009 | Gao et al. | |
| 2009/0217512 A1 | 9/2009 | Tian et al. | |
| 2009/0217513 A1 | 9/2009 | Xi et al. | |
| 2009/0220856 A1 | 9/2009 | Tian et al. | |
| 2009/0220858 A1 | 9/2009 | Cheng | |
| 2009/0220860 A1 | 9/2009 | Xi et al. | |
| 2009/0302283 A1 | 12/2009 | Xia et al. | |
| 2010/0028771 A1 | 2/2010 | Zhou et al. | |
| 2010/0059706 A1 | 3/2010 | Dai et al. | |

FOREIGN PATENT DOCUMENTS

| | | |
|---|---|---|
| CN | 1259773 | 7/2000 |
| CN | 1401559 | 3/2003 |
| CN | 1410349 | 4/2003 |
| CN | 1424980 | 6/2003 |
| CN | 1401559 A | 2/2004 |
| CN | 1559889 | 1/2005 |
| CN | 1641912 | 7/2005 |
| CN | 1648036 | 8/2005 |
| CN | 1677718 | 10/2005 |
| CN | 1762798 | 4/2006 |
| CN | 1773754 | 5/2006 |
| CN | 1775665 | 5/2006 |
| CN | 1775665 A | 5/2006 |
| CN | 2006066470 | 6/2006 |
| CN | 1641912 A | 7/2006 |
| CN | 1797823 | 7/2006 |
| CN | 1964125 | 5/2007 |
| CN | 1986395 | 6/2007 |
| CN | 1989649 | 6/2007 |
| CN | 101047268 | 10/2007 |
| CN | 101087021 | 12/2007 |
| CN | 101106189 | 1/2008 |
| CN | 101128950 | 2/2008 |
| CN | 101207197 | 6/2008 |
| CN | 101209827 | 7/2008 |
| CN | 101212048 | 7/2008 |

(Continued)

OTHER PUBLICATIONS

Related U.S. Appl. No. 12/035,978, entitled "Lithium Iron Phosphate Cathode Material," Final Office Action (mailed Dec. 7, 2009).

G.X. Wang et al., "Physical and electrochemical properties of doped lithium iron phosphate electrodes." Electrochimica Acta 50 (2004) 443-447.

Transaction History of U.S. Appl. No. 12/127,431, filed May 27, 2008, entitled "Lithium Iron Phosphate Cathode Material."

Transaction History of U.S. Appl. No. 12/035,978, filed Feb. 2, 2008, entitled "Lithium Iron Phosphate Cathode Material."

(Continued)

*Primary Examiner* — Laura Weiner

(74) *Attorney, Agent, or Firm* — Greenberg Traurig, LLP

(57) ABSTRACT

Described are cathode materials for lithium batteries. Better cathode materials may be produced by mixing at least two compounds and a binder additive. The first compound includes one or more salts of lithium metal phosphorous while the second compound includes one or more lithium transition metal oxides. In other instances, a conductive additive may also be incorporated. The cathode materials so produced exhibit enhanced electrical properties and thermal stability.

8 Claims, No Drawings

FOREIGN PATENT DOCUMENTS

| | | |
|---|---|---|
| CN | 101399343 | 4/2009 |
| CN | 101420048 | 4/2009 |
| CN | 101453019 | 6/2009 |
| CN | 101471432 | 7/2009 |
| CN | 101478041 | 7/2009 |
| CN | 101478042 | 7/2009 |
| CN | 101494305 | 7/2009 |
| EP | 1553647 | 7/2005 |
| EP | 1855334 | 11/2007 |
| JP | 2004-241242 * | 8/2004 |
| WO | 9740541 | 10/1997 |
| WO | 2005076936 | 8/2005 |
| WO | 2006066470 | 6/2006 |
| WO | 2006112674 | 10/2006 |
| WO | 2008109734 | 9/2008 |

OTHER PUBLICATIONS

Related U.S. Appl. No. 12/035,978, entitled "Lithium Iron Phosphate Cathode Material," Final Office Action (mailed Jan. 9, 2009).

Related U.S. Appl. No. 12/035,978, entitled "Lithium Iron Phosphate Cathode Material ," Non-Final Office Action (mailed Apr. 27, 2009).

Related U.S. Appl. No. 12/035,978, entitled "Lithium Iron Phosphate Cathode Material ," Non-Final Office Action (mailed Oct. 2, 2008).

Related U.S. Appl. No. 12/127,431, entitled "Lithium Iron-Phosphate Cathode Material," Non-Final Office Action (mailed Jan. 30, 2009).

Hu Huan-Yu, et al. Influence of the MG-substitution on electrochemical performances of LiFePO , 1994-2008, p. 18-20 China Acad. Journ Elect. Publ. House, 2006.1 vol. 30 No. 1.

Related U.S. Appl. No. 12/127,431, entitled "Lithium Iron-Phosphate Cathode Material," Final Office Action (mailed Jun. 26, 2009).

Yun et al., "Synthesis and electrochemcial properties of olivine-type LiFe PO4/C composite cathode material prepared from a poly(vinyl alcohol)-containg precursor." Journal of Power Sources vol. 160, issue 2, Oct. 2006, pp. 1361-1368 (Available online May 9, 2006).

European Search Report for EP09400001 (mailed Apr. 14, 2009).

International Patent Application Serial No. PCT/CN08/70391, International Search Report and Written Opinion (mailed Jul. 17, 2008).

Pei, Su-hua et al., "Sensitivity of $TiO^2$ : NB2O5 composite crystalliod to trimethylamine", Journal of Functional Materials and Devices, vol. 12, No. 3, Jun. 2006.

USPTO Transaction History of related U.S. Appl. No. 12/035,978, filed Feb. 22, 2008, entitled "Lithium Iron Phosphate Cathode Material."

USPTO Transaction History of related U.S. Appl. No. 12/040,773, filed Feb. 29, 2008, entitled "Composite Compound with Mixed Crystalline Structure."

USPTO Transaction History of related U.S. Appl. No. 12/127,431, filed May 27, 2008, entitled "Lithium Iron Phosphate Cathode Material."

USPTO Transaction History of related U.S. Appl. No. 12/198,087, filed Aug. 25, 2008, entitled "Lithium-Ion Rechargeable Battery Preparation."

USPTO Transaction History of related U.S. Appl. No. 12/254,537, filed Oct. 20, 2008, entitled "Lithium Iron(II) Phosphate Cathode Active Material."

USPTO Transaction History of related U.S. Appl. No. 12/273,649, filed Nov. 19, 2008, entitled "Composite Separator Films for Lithium-Ion Batteries."

USPTO Transaction History of related U.S. Appl. No. 12/316,165, filed Dec. 9, 2008, entitled "Composite Compound with Mixed Crystalline Structure."

USPTO Transaction History of related U.S. Appl. No. 12/316,173, filed Dec. 9, 2008, entitled "Composite Compound with Mixed Crystalline Structure."

USPTO Transaction History of related U.S. Appl. No. 12/316,180, filed Dec. 9, 2008, entitled "Composite Compound with Mixed Crystalline Structure."

USPTO Transaction History of related U.S. Appl. No. 12/316,234, filed Dec. 9, 2008, entitled "Composite Compound with Mixed Crystalline Structure."

USPTO Transaction History of related U.S. Appl. No. 12/352,981, filed Jan. 13, 2009, entitled "Electrolyte for Batteries and Battery Packs."

USPTO Transaction History of related U.S. Appl. No. 12/436,347, filed May 6, 2009, entitled "Transition Metal Hydroxide and Oxide, Method of Producing the Same, and Cathode Material Containing the Same."

USPTO Transaction History of related U.S. Appl. No. 12/482,690, filed Jun. 11, 2009, entitled "Electrolyte for Lithium Batteries."

Related U.S. Appl. No. 12/127,431, entitled "Lithium Iron-Phosphate Cathode Material," Non-Final Office Action (mailed Oct. 20, 2009).

* cited by examiner

CATHODE MATERIALS FOR LITHIUM BATTERIES

CROSS REFERENCE TO RELATED APPLICATIONS

This application is related to a commonly owned U.S. patent application Ser. No. 12/035,978 filed Feb. 22, 2008, which is incorporated herein by reference in its entirety for all purposes.

FIELD OF THE INVENTION

The embodiments of the present invention relate to batteries, more specifically, to a cathode material for lithium batteries.

BACKGROUND

Lithium batteries are widely used and can be found in laptop computers, cameras, camcorders, PDAs, cell phones, ipods and other portable electronic devices. These batteries are also growing in popularity for defense, automotive and aerospace applications because of their high energy density.

Lithium phosphate-based cathode materials for batteries have long been known in the industry. People have used metal intercalation compound to improve the electrical property of lithium phosphate. One popular intercalation compound is lithium iron phosphate ($LiFePO_4$). Because of its non-toxicity, thermal stability, safety characteristics and good electrochemical performance, there is a growing demand for rechargeable lithium secondary batteries with $LiFePO_4$ as the cathode material.

The present invention teaches a better cathode material using lithium metal phosphate salts and other metal intercalation compounds. The prior art materials can result in batteries with poor coating quality that are vulnerable to electrolytic reactions. These reactions can cause poor electrical and thermal properties in the batteries, especially when such requirements are necessary for batteries used in electric vehicles.

As such, there is a need for a better cathode material for lithium batteries with enhanced electrical and thermal performance.

SUMMARY

A first embodiment of the present invention discloses a cathode material for lithium batteries comprising: a first compound; a binder component; and a second compound, wherein the second compound can be formed by distributing the first compound into the second compound. The first compound includes one or more salts of lithium metal phosphate, wherein the lithium metal phosphate salt has the general formula $Li_{1+X}M_YPO_4$, wherein: $-0.1 \leq X \leq 0.2$, $0.9 \leq Y \leq 1.1$; and M includes one or more members of calcium, iron, aluminum, titanium, cobalt, boron, chromium, nickel, magnesium, zirconium, gallium, vanadium, manganese, zinc and other elements. In one embodiment, the lithium metal phosphate salt has an average particle size of about 1 to 10 microns.

The second compound includes one or more members of lithium transition metal oxide, wherein the lithium transition metal oxide has the general formula $Li_{1+X}Ni_{1-Y-Z}Mn_YCo_ZM_PO_2$, wherein: $-0.1 \leq X \leq 0.2$, $0 \leq Y \leq 1$, $0 \leq Z \leq 1$, $0 \leq Y+Z \leq 1.0$, $0 \leq P \leq 0.2$; and M includes one or more members of boron, magnesium, aluminum, titanium, chromium, iron, zirconium, copper, zinc, gallium, yttrium, fluorine, iodine, sulfur and other elements. In another embodiment, the lithium transition metal oxide has the general formula $Li_{1+X}Mn_YM_{2-Y}O_4$, wherein: $-0.1 \leq X \leq 0.2$, $1.7 \leq Y \leq 2.0$; and M includes one or more members of boron, magnesium, aluminum, titanium, chromium, iron, cobalt, zirconium, nickel, copper, zinc, gallium, yttrium, fluorine, iodine, sulfur and other elements. The second compound can be formed when one or more salts of lithium metal phosphate encapsulate one or more lithium transition metal oxide. In one embodiment, the second compound has an average particle size of about 5-14 microns. The weight ratio of the first compound to the second compound can vary between about 9.5:0.5 to 0.5:9.5. In certain examples, the first and second compounds include one or more members selected from the group including $LiFePO_4$, $LiCoO_2$ and $LiMn_2O_4$.

The binder component is about 0.01-8% of the total weight of the cathode material, wherein the binder component includes one or more members of polyvinylidene fluoride (PVDF), polytetrafluoroethylene (PTFE) and styrene-butadiene rubber (SBR). In another embodiment, the cathode material further includes at least one conductive additive, wherein the conductive additive is about 2-20% of the total weight of the cathode material. The conductive additive includes one or more members of graphite, carbon fiber, carbon black, metal powders and fibers. The cathode material can be incorporated in a battery having the cathode material, an anode and an electrolyte.

Another embodiment of the present invention discloses a cathode material for lithium batteries comprising: a first compound; a binder component; and a second compound, wherein the second compound includes one or more members of lithium transition metal oxide, acetylene black, superconducting carbon black, conductive graphite and conductive carbon fiber, and wherein the average particle size of the second compound is larger than the average particle size of the first compound. The first compound includes one or more salts of lithium metal phosphate, wherein the lithium metal phosphate salt has the general formula $Li_{1+X}M_YPO_4$, wherein: $-0.1 \leq X \leq 0.2$, $0.9 \leq Y \leq 1.1$; and M includes one or more members of calcium, iron, aluminum, titanium, cobalt, boron, chromium, nickel, magnesium, zirconium, gallium, vanadium, manganese, zinc and other elements. In one embodiment, the lithium metal phosphate salt has an average particle size of about 1 to 6 microns.

In one instance, the lithium transition metal oxide has the general formula $Li_{1+X}Ni_{1-Y-Z}Mn_YCo_ZM_PO_2$, wherein: $-0.1 \leq X \leq 0.2$, $0 \leq Y \leq 1$, $0 \leq Z \leq 1$, $0 \leq Y+Z \leq 1.0$, $0 \leq P \leq 0.2$; and M includes one or more members of boron, magnesium, aluminum, titanium, chromium, iron, zirconium, copper, zinc, gallium, yttrium, fluorine, iodine, sulfur and other elements. In another instance, the lithium transition metal oxide has the general formula $Li_{1+X}Mn_YM_{2-Y}O_4$, wherein: $-0.1 \leq X \leq 0.2$, $1.7 \leq Y \leq 2.0$; and M includes one or more members of boron, magnesium, aluminum, titanium, chromium, iron, zirconium, copper, zinc, gallium, yttrium, fluorine, iodine, sulfur, cobalt, nickel and other elements. In specific embodiments, the lithium transition metal oxide includes one or more members selected from the group including $LiCoO_2$, $LiMn_2O_4$ and $LiNiO_2$. The lithium transition metal oxide has an average particle size of about 4 to 20 microns.

The binder component includes one or more members of polyvinylidene fluoride (PVDF), polyvinyl alcohol (PVA), polyethylene acid butyral, polyacrylic acid resin, carboxymethyl cellulose (CMC), methyl cellulose, ethyl cellulose, hydroxypropyl methylcellulose (HPMC) and other polymeric material. In other examples, the cathode material can further include at least one conductive additive. The cathode material can be incorporated in a battery having the cathode material, an anode and an electrolyte.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

The present invention provides new compositions of cathode materials for lithium batteries. The invention utilizes at least two compounds and a binder component in a way to significantly improve the electrical and thermal properties of the cathode material. In other instances, a conductive additive may be provided to the composition. The cathode material produced by the present invention exhibits superior particle homogeneity and high electrical capacity especially during high electrical discharges. Furthermore, the cathode material also exhibit superior thermal properties. Such cathode materials are better suited for applications including without limitations electric vehicles and notebook computers.

Accordingly, a first embodiment of the present invention calls for a cathode material for lithium secondary batteries, wherein the cathode material includes at least one cathode active material and at least one binder component. In other embodiments, at least a conductive additive may be incorporated. The cathode active material includes compound A and compound B, wherein compound A includes olivine-structured lithium metal phosphate salts and can take on the chemical formula (1), while compound B includes materials of compound A subjected to a first type of lithium transition metal oxide C as shown in chemical formula (2) or a second type of lithium transition metal oxide D as shown in chemical formula (3). In some examples, the lithium transition metal oxides C and D can be encapsulated or surrounded by the lithium metal phosphate salts.

$$Li_{1+X}M_YPO_4 \quad (1), \text{wherein:}$$

$-0.1 \leq X \leq 0.2$, $0.9 \leq Y \leq 1.1$, and M includes one or more members of calcium, iron, aluminum, titanium, cobalt, boron, chromium, nickel, magnesium, zirconium, gallium, vanadium, manganese, zinc and other elements.

$$Li_{1+X}Ni_{1-Y-Z}Mn_YCo_ZM_PO_2 \quad (2), \text{wherein:}$$

$-0.1 \leq X \leq 0.2$, $0 \leq Y \leq 1$, $0 \leq Z \leq 1$, $0 \leq Y+Z \leq 1.0$, $0 \leq P \leq 0.2$, and M includes one or more members of boron, magnesium, aluminum, titanium, chromium, iron, zirconium, copper, zinc, gallium, yttrium, fluorine, iodine, sulfur and other elements.

$$Li_{1+X}Mn_YM_{2-Y}O_4 \quad (3), \text{wherein:}$$

$-0.1 \leq X \leq 0.2$, $1.7 \leq Y \leq 2.0$, and M includes one or more members of boron, magnesium, aluminum, titanium, chromium, iron, cobalt, zirconium, nickel, copper, zinc, gallium, yttrium, fluorine, iodine, sulfur and other elements.

In this embodiment, compound A has an average particle size of about 1-10 microns while compound B has an average particle size of about 5-14 microns. In certain examples, the weight ratio of compound A to compound B can vary between about 9.5:0.5 to 0.5:9.5. The amount of conductive additive that can be added to the cathode material is about 2-20% of the total weight of the cathode active material, while the amount of binder component that can be added to the cathode material is about 0.01-8% of the total weight of the cathode active material.

In one specific embodiment based on the chemical formulas above, compound A can be $LiFePO_4$, lithium transition metal oxide C can be $LiCoO_2$, while lithium transition metal oxide D can be $LiMn_2O_4$. The resulting compound B, having compound A subjected to lithium transition metal oxide C or lithium transition metal oxide D, has a weight of about 0.0001 to 0.1. In one instance, the lithium metal phosphate salt can be purchase from a third party vendor or supplier. In the alternative, the lithium metal phosphate salt can also be manufactured from known methods of preparation.

The method of manufacturing compound B includes hydrothermal processing, sol-gel processing, precipitation method, oxidation-reduction liquid coating method, and the coating material method for manufacturing lithium transition metal oxides C or D. The types of coating material include slurries of lithium salts, phosphate salts and ferrous salts. The lithium salt includes one or more members of lithium phosphate, lithium carbonate, lithium hydroxide, lithium oxalate and lithium acetate. The phosphate salt includes one or more members of ammonium, diammonium phosphate (DAP), ammonium phosphate and lithium phosphate. The ferrous salt includes one or more members of ferrous oxalate, ferrous acetate, ferrous chloride, ferrous sulfate, iron sulfate and hydrated iron sulfate.

The method of preparing compound B includes mixing the coating material with lithium transition metal oxides C or D in water or one or more organic solvents and mixtures thereof. In the alternative, the coating material can be mixed in water or organic solvent to provide a coating precursor, which can subsequently be mixed with the lithium transition metal oxides C or D. Solvent evaporation can be carried out at between 300 to 900° C. for 1 to 24 hours and cooled at ambient to procure the desired compound B.

In these embodiments, subjecting compound A to lithium transition metal oxides C or D provides compound B with enhanced electrical conductivity and effectively raises the electrical conductivity of the cathode material leading to higher capacity and better charge/discharge performance.

Compound B, having compound A coupled with lithium transition metal oxide C or lithium transition metal oxide D, is not likely to dissociate and undergo compositional or structural changes when subjected to charge/discharge cycles. The compound also has good thermal stability and can minimize the amount of direct contact between the lithium transition metal oxides C or D and the electrolyte allowing the battery to deliver enhanced charge/discharge cycle performance as well as safety performance.

The conductive additive for the cathode material can include one or more members of graphite, carbon fiber, carbon black, metal powders and fibers. In the alternative, other types of conductive additives known by one skilled in the art can be incorporated. The addition of the conductive additive can improve the electrical conductivity of the cathode material. In addition, the conductive additive can mitigate the amount of volumetric expansion exhibited in the cathode material. Namely, when lithium iron phosphate is mixed with compound B, the cathode active material can expand and contract with the lithium. But because of the interaction between the conductive additive and the cathode active material during performance testing, the addition of the conductive additive can lead to the battery having increased cycling performance and high temperature storage capability.

The binder additive for the cathode material can include one or more members of polyvinylidene fluoride (PVDF), polytetrafluoroethylene (PTFE) and styrene-butadiene rubber (SBR). It is understood that other binder additives may be utilized.

The presently disclosed embodiments can provide a lithium secondary battery having a battery shell, positive and negative electrodes and associated electrolyte, wherein the electrodes and electrolyte are sealed within the battery shell. The electrodes include rolled or stacked positive and negative films along with the dividing membrane, wherein the positive film incorporates at least a conductive current collector and a cathode active material. It is understood that various conductive current collector can be utilized including without limitation aluminum foil, copper foil and pierced coils. Further, the positive film can be fabricated using methods known in the art. For example, the cathode active material, binder and conductive additives can be dissolved in a suitable solvent to provide a slurry mixture and subsequently applied onto a conductive substrate, dried, rolled and cut into suitable die form.

In the methods disclosed above, the cathode active material, conductive additive, and binder additive can be mixed in one or more solvents known by one skilled in the art including without limitation N-methylpyrrolidone (NMP), dimethylformamide (DMF), diethylformamide (DEF), dimethyl sulfoxide (DMSO), tetrahydrofuran (THF), water and alcohol. It is understood that other solvents may be utilized. The amount of solvent should be sufficient to generate a slurry material for coating on the conductive current collector. In one example, the amount of solvent for the slurry is about 40-90% by weight of the cathode active material.

Various methods of drying, rolling and die cutting of the cathode material can be carried out using techniques generally known by those skilled in the art. In one instance, the cathode films can be dried at a temperature of about 60-120° C. for 0.5-5 hours. Other drying temperatures and times can also be utilized.

The electrodes composition for the lithium secondary battery can utilize those known by one skilled in the art. For example, the system and method of winding, stacking and positioning the positive and negative films along with the dividing membrane can be accomplished as appreciated by one skilled in the art.

The anode material can utilize any material understood by one skilled in the art. In one embodiment, the anode material can include at least one anode active material, binder additive and a conductive additive. In other embodiments, an electrode-containing fluid can be coated on the anode active material. The anode active material can incorporate various types of active material known in the art including without limitation carbon materials. The carbon materials can include graphite carbon, graphite and other acetylene polymeric materials oxidized at high temperatures to provide the carbon component. Other carbon materials including pyrolytic carbon, coke, sintered organic polymer and activated carbon can be incorporated. In other instances, organic polymers sintered by phenolic resin, epoxy resin or having sintered by carbonization may also be contemplated.

The binder additive can utilize any material understood by one skilled in the art. In one example, the binder additive includes hydrophobic and hydrophilic binder mixtures, wherein various ratios of hydrophobic and hydrophilic component can be incorporated without limitation. In certain examples, the hydrophilic binder component to the hydrophobic binder component has a weight ratio varying between about 0.3:1 to 1:1. The binder additive can come in a solid form, an emulsified form or as an aqueous solution. The coating and viscosity of the binder additive to be applied can be operationally and functionally adjusted as necessary. In one embodiment, the hydrophilic binder solution has a concentration of 0.5-4% by weight while the hydrophobic binder solution has a concentration of 10-80% by weight. The hydrophobic binder component can include one or more members of polytetrafluoroethylene (PTFE), styrene-butadiene rubber (SBR) or mixtures thereof, while the hydrophilic binder component can include one or more members of hydroxypropyl methyl cellulose (HPMC), sodium carboxymethyl cellulose (CMC), polyvinyl alcohol (PAC) or hydroxyethyl cellulose (HEC).

The anode material can also include one or more members of a plurality of conductive additives without any restriction. For example, the anode conductive additive can include one or more members of conductive carbon black, nickel powder and copper powder. Using the weight of the anode active material as a standard, the amount of conductive additive that can be added to the anode active material is about 0.1-12% by weight of the active material. It will be appreciated by one skilled in the art that other types of conductive additives and anode active materials can be incorporated.

The anode material can be prepared through a variety of means as can be understood by one skilled in the art including using the proper amount and type of solvents for dissolving the anode active material, binder and conductive additives to form the slurry mixture. The coating and viscosity of the slurry mixture to be applied can be operationally and functionally adjusted as necessary. Subsequently, the anode material slurry mixture can be applied on the anode current collector, compressed and dried into an anode film and cut into the proper die for testing purposes. In one instance, the drying temperature is about 120° C. for a period of 5 hours. It will be appreciated by one skilled in the art that other amounts of solvent for providing the proper viscosity and mobility or for coating on the current collectors as well as the drying and die forming methods and conditions can be utilized. Likewise, the types of solvent can include water, water-soluble solvents, and water-soluble solvents having 1 to 6 carbons including alcohols, acetone, N,N-dimethylformamide and mixtures thereof.

A dividing membrane having enhanced electric insulation properties and the ability to maintain liquidity can be provided between the cathode and anode materials. The dividing membrane should also be capable of being received within the battery core and not be susceptible to the non-aqueous electrolyte. As such, the dividing membrane can take on one or more members of polyolefin micro-porous membrane, polyethylene vinyl film, fiberglass or ultrafine glass fiber paper. It is understood that other types of dividing membrane can be incorporated and that their location and nature can be appreciated by one skilled in the art.

The electrolyte for the presently disclosed embodiments can be non-aqueous, wherein the non-aqueous electrolyte mixture can be provided by dissolving electrolytic lithium salts in a non-aqueous solvent or solution. For example, the non-aqueous electrolytic salt can include one or more members of lithium hexafluorophosphate ($LiPF_6$), lithium perchlorate ($LiClO_4$), lithium tetrafluoroborate ($LiBF_4$), lithium hexafluoroarsenate ($LiAsF_6$), lithium silicate hexafluoride ($LiSiF_6$), lithium tetraphenylborate ($LiB(C_6H_5)_4$), lithium chloride (LiCl), lithium bromide (LiBr), lithium aluminum chloride ($LiAlCl_4$), $LiC(SO_2CF_3)_3$, $LiCH_3SO_3$, $LiN(SO_2CF_3)_2$ and lithium halide. The non-aqueous solvents can include organic solvents having chain ester and ring ester mixtures including dimethyl carbonate (DMC), diethyl carbonate (DEC), ethyl methyl carbonate (EMC), methyl propyl carbonate (MPC), dipropyl carbonate (DPC) and mixtures thereof can also be incorporated. In addition, other organic ester chains having fluorine, sulfur or unsaturated bonds, cyclic esters including ethylene carbonate (EC), propylene carbonate (PC), vinylene carbonate (VC), γ-butyrolactone (γ-BL), methyl lactone and other organic ester rings having fluorine, sulfur or unsaturated bonds may also be contemplated. The quantity of electrolyte to inject into the battery generally has a concentration of 0.1-2.0 mole/liter, although other amounts and concentrations can be incorporated. It is understood that other non-aqueous electrolytes and solvents can be incorporate as appreciated by one skilled in the art.

It will be further appreciated that the presently disclosed lithium secondary batteries including methods of preparing same can utilize any techniques as known by one skilled in the art. For example, techniques of preparing the battery including winding the material into the battery core, injecting the electrolyte solvent, and sealing the electrolyte within the battery core, can all incorporate other techniques known in the industry.

The following are examples of cathode materials having at least one cathode active material, one conductive additive, and one binder additive.

EXAMPLE A1

Dissolve $FeSO_4$ (weight of Fe is 0.1 weight % of $LiCoO_2$): $H_3PO_4$: LiOH having molar ratio of 1:1:3 in water, add $LiCoO_2$ powder, mix uniformly and evaporate the solvent. Heat the mixture at a temperature of 700° C. for 6 hours and then cool to provide $LiCoO_2/LiFePO_4$ coated materials with an average particle size of 10 microns.

Add $LiFePO_4$:($LiCoO_2/LiFePO_4$):(graphite+carbon black):PVDF having weight ratio of 70:30:(6+3):5 in a solvent formed by dissolving polyvinylidene fluoride (PVDF) in N-methylpyrrolidone (NMP) at a ratio of 1:10, mix uniformly to provide $LiFePO_4$ with an average particle size of 5 microns and $LiCoO_2/LiFePO_4$ coated material with an average particle size of 10 microns. Apply an even coating of the slurry on a 20 micron thick aluminum foil, dry at 120 ° C., cut and roll to a 450×42×170 $mm^3$ cathode film with about 5.0 grams of the material as the cathode active ingredient.

EXAMPLE A2

Dissolve $FeSO_4$ (weight of Fe is 0.1 weight % of $LiCoO_2$): $H_3PO_4$: LiOH having molar ratio of 1:1:3 in water, add $LiCoO_2$ powder, mix uniformly and evaporate the solvent. Heat the mixture at a temperature of 700° C. for 6 hours and then cool to provide $LiCoO_2/LiFePO_4$ coated materials with an average particle size of 13 microns.

Add $LiFePO_4$:($LiCoO_2/LiFePO_4$):(graphite+carbon black):PVDF having weight ratio of 90:10:(6+3):5 in a solvent formed by dissolving polyvinylidene fluoride (PVDF) in N-methylpyrrolidone (NMP) at a ratio of 1:10, mix uniformly to provide $LiFePO_4$ with an average particle size of 9 microns and $LiCoO_2/LiFePO_4$ coated material with an average particle size of 13 microns. Apply an even coating of the slurry on a 20 micron thick aluminum foil, dry at 120° C., cut and roll to a 450×42×170 $mm^3$ cathode film with about 5.0 grams of the material as the cathode active ingredient.

EXAMPLE A3

Dissolve $FeSO_4$ (weight of Fe is 0.1 weight % of $LiCoO_2$): $H_3PO_4$: LiOH having molar ratio of 1:1:3 in water, add $LiMn_2O_4$ powder, mix uniformly and evaporate the solvent. Heat the mixture at a temperature of 700° C. for 6 hours and then cool to provide $LiMn_2O_4/LiFePO_4$ coated materials with an average particle size of 10 microns.

Add $LiFePO_4$:($LiMn_2O_4$ /$LiFePO_4$):(graphite+carbon black):PVDF having weight ratio of 70:30:(6+3):5 in a solvent formed by dissolving polyvinylidene fluoride (PVDF) in N-methylpyrrolidone (NMP) at a ratio of 1:10, mix uniformly to provide $LiFePO_4$ with an average particle size of 2 microns and $LiMn_2O_4/LiFePO_4$ coated material with an average particle size of 6 microns. Apply an even coating of the slurry on a 20 micron thick aluminum foil, dry at 120° C., cut and roll to a 450×42×170 $mm^3$ cathode film with about 5.0 grams of the material as the cathode active ingredient.

EXAMPLE A4

Dissolve $FeSO_4$ (weight of Fe is 0.1 weight % of $LiCoO_2$): $H_3PO_4$: LiOH having molar ratio of 1:1:3 in water, add $LiCoO_2$ powder, mix uniformly and evaporate the solvent. Heat the mixture at a temperature of 700° C. for 6 hours and then cool to provide $LiCoO_2/LiFePO_4$ coated materials.

Add $LiFePO_4$ :($LiCoO_2/LiFePO_4$):(graphite+metal powder):PVDF having weight ratio of 70:30:(2+1):5 in a solvent formed by dissolving polyvinylidene fluoride (PVDF) in N-methylpyrrolidone (NMP) at a ratio of 1:10, mix uniformly to provide the cathode materials. Apply an even coating of the slurry on a 20 micron thick aluminum foil, dry at 120° C., cut and roll to a 450×42×170 $mm^3$ cathode film with about 5.0 grams of the material as the cathode active ingredient.

EXAMPLE A5

Dissolve $FeSO_4$ (weight of Fe is 0.1 weight % of $LiCoO_2$): $H_3PO_4$: LiOH having molar ratio of 1:1:3 in water, add $LiCoO_2$ powder, mix uniformly and evaporate the solvent. Heat the mixture at a temperature of 700° C. for 6 hours and then cool to provide $LiCoO_2/LiFePO_4$ coated materials.

Add $LiFePO_4$:($LiCoO_2/LiFePO_4$):(carbon black+carbon fiber):PVDF having weight ratio of 30:70:(6+3):5 in a solvent formed by dissolving polyvinylidene fluoride (PVDF) in N-methylpyrrolidone (NMP) at a ratio of 1:10, mix uniformly to provide the cathode materials. Apply an even coating of the slurry on a 20 micron thick aluminum foil, dry at 120° C., cut and roll to a 450×42×170 $mm^3$ cathode film with about 5.0 grams of the material as the cathode active ingredient.

EXAMPLE A6

Dissolve $FeSO_4$ (weight of Fe is 0.1 weight % of $LiCoO_2$): $H_3PO_4$: LiOH having molar ratio of 1:1:3 in water, add $LiCoO_2$ powder, mix uniformly and evaporate the solvent. Heat the mixture at a temperature of 700° C. for 6 hours and then cool to provide $LiCoO_2/LiFePO_4$ coated materials.

Add $LiFePO_4$:($LiCoO_2/LiFePO_4$):(carbon black+carbon fiber):PVDF having weight ratio of 70:30:(7+5):5 in a solvent formed by dissolving polyvinylidene fluoride (PVDF) in N-methylpyrrolidone (NMP) at a ratio of 1:10, mix uniformly to provide the cathode materials. Apply an even coating of the slurry on a 20 micron thick aluminum foil, dry at 120° C., cut and roll to a 450×42×170 $mm^3$ cathode film with about 5.0 grams of the material as the cathode active ingredient.

EXAMPLE A7

Dissolve $FeSO_4$ (weight of Fe is 0.1 weight % of $LiCoO_2$): $H_3PO_4$: LiOH having molar ratio of 1:1:3 in water, add LiCoO$_2$ powder, mix uniformly and evaporate the solvent. Heat the mixture at a temperature of 700° C. for 6 hours and then cool to provide LiCoO$_2$/LiFePO$_4$ coated materials.

Add LiFePO$_4$:(LiCoO$_2$/LiFePO$_4$):(graphite+carbon black):PVDF having weight ratio of 70:30:(1+4):5 in a solvent formed by dissolving polyvinylidene fluoride (PVDF) in N-methylpyrrolidone (NMP) at a ratio of 1:10, mix uniformly to provide the cathode materials. Apply an even coating of the slurry on a 20 micron thick aluminum foil, dry at 120° C., cut and roll to a 450×42×170 mm$^3$ cathode film with about 5.0 grams of the material as the cathode active ingredient.

EXAMPLE A8

Dissolve FeSO$_4$ (weight of Fe is 0.1 weight % of LiCoO$_2$): H$_3$PO$_4$: LiOH having molar ratio of 1:1:3 in water, add LiCoO$_2$ powder, mix uniformly and evaporate the solvent. Heat the mixture at a temperature of 700° C. for 6 hours and then cool to provide LiCoO$_2$/LiFePO$_4$ coated materials.

Add LiFePO$_4$:(LiCoO$_2$/LiFePO$_4$):(graphite+carbon black):PVDF having weight ratio of 60:40:(1.5+1):5 in a solvent formed by dissolving polyvinylidene fluoride (PVDF) in N-methylpyrrolidone (NMP) at a ratio of 1:10, mix uniformly to provide the cathode materials. Apply an even coating of the slurry on a 20 micron thick aluminum foil, dry at 120° C., cut and roll to a 450×42×170 mm$^3$ cathode film with about 5.0 grams of the material as the cathode active ingredient.

REFERENCE A9

Add LiFePO$_4$:graphite:PVDF having weight ratio of 100:9:5 in a solvent formed by dissolving polyvinylidene fluoride (PVDF) in N-methylpyrrolidone (NMP) at a ratio of 1:10, mix uniformly to provide a LiFePO$_4$ coated material. Apply an even coating of the slurry on a 20 micron thick aluminum foil, dry at 120° C., cut and roll to a 450+42+170 mm$^3$ cathode film with about 5.0 grams of the material as the cathode active ingredient.

TESTING OF EXAMPLES A1-A8 AND REFERENCE A9

(1) Battery Preparation
(a) Preparation of Cathode Material
The cathode materials are prepared as shown above.
(b) Preparation of Anode Material Dissolve polyvinylidene fluoride (PVDF) in N-methylpyrrolidone (NMP) at a ratio of 1:10. Add artificial graphite into the solution and thoroughly mix to provide an anode material having a ratio of 100:5 of artificial graphite: PVDF. Apply an even coating on a 20 micron thick copper foil, dry at 120° C., cut and roll to a 470×45×120 mm$^3$ anode film to provide about 2.5 grams of artificial graphite.

(c) Battery Assembly

Separately wind each of the cathode and anode active materials with 25 micron thick polypropylene film into a lithium secondary battery core, followed by dissolving 1M LiPF$_6$ in a mixture of non-aqueous electrolyte solvent ethylene carbonate/dimethyl carbonate (EC/DMC) having a ratio of 1:1, inject and seal the electrolyte within the battery core to provide a 5×34×50 mm$^3$ lithium ion battery having a capacity of 720 mAh.

(2) Battery Capacity Testing

Charge each of the batteries A1-A9 at 1 C mA current charge to 3.8 volts. Upon reaching 3.8 volts, charge at constant voltage with a limit of 0.05 C mA current charge and set aside for 5 minutes. Discharge at 1 C mA current charge to 2.0 volts and set aside for 5 minutes. The battery capacities of discharging at 1 C mA current charge to 2.0 volts are shown in Table 1.

(3) High Temperature Performance Cycle Testing

At 60° C., charge each of the batteries A1-A9 at 1 C mA current charge to 3.8 volts. Upon reaching 3.8 volts, charge at constant voltage with a limit of 0.05 C mA current charge and set aside for 5 minutes. Discharge at 1 C mA current charge to 2.0 volts and set aside for 5 minutes. Repeat the steps above at least 300 times. After 300 cycles, record the battery capacity of discharging at 1 C mA current charge to 2.0 volts. Table 1 illustrates the battery capacity maintenance rate, which can be determined by comparing the capacity at the end of the multiple cycles versus the initial cycle.

TABLE 1

Capacity testing of batteries A1-A9.

| Sample number | Battery capacity (mAh) | Battery capacity maintenance rate (%) |
|---|---|---|
| A1 | 738 | 88.6 |
| A2 | 718 | 89.5 |
| A3 | 722 | 86.4 |
| A4 | 729 | 88.7 |
| A5 | 750 | 86.4 |
| A6 | 732 | 90.2 |
| A7 | 750 | 89.6 |
| A8 | 690 | 80.1 |
| A9 | 620 | 74.0 |

From the results in Table 1, examples A1-A8 exhibited higher battery capacity and higher capacity maintenance rates than reference A9 by between 70-130 mAh and 6.1-16.2%, respectively. Accordingly, the cathode materials and methods of manufacturing same according to the presently disclosed embodiments can provide lithium secondary batteries with enhanced capacity and associated maintenance rate.

(4) High Temperature Storage Performance Testing

At room temperature, charge each of the batteries A1-A9 at 1 C mA current charge to 3.8 volts. Upon reaching 3.8 volts, charge at constant voltage with a limit of 0.05 C mA current charge and set aside for 5 minutes. Accurately determine each battery's thickness and place each battery in storage for a week at 60° C. Afterwards, determine each battery's capacity by discharging at 1 C mA current charge to 2.0 volts and repeat the thickness measurement. Table 5 illustrates each battery's capacity maintenance rate and thickness variations as calculated using initial and subsequent values.

(5) Large Current Discharge Performance Testing

At room temperature, charge each of the batteries A1-A9 at 1 C mA current charge to 3.8 volts. Upon reaching 3.8 volts, charge at constant voltage with a limit of 0.05 C mA current charge and set aside for 5 minutes. Discharge at 0.2 C mA current charge to 2.0 volts and set aside for 5 minutes. Record the battery capacities of discharging at 0.2 C mA current charge to 2.0 volts. Repeat the steps above at 3 C mA and 5 C mA. Record the battery capacities of discharging at 3 C mA current charge to 2.0 volts and at 5 C mA current charge to 2.0 volts. The battery discharge capacity ratios at different current charges are shown in Table 5.

(6) Safety Performance Testing

At room temperature, charge each of the batteries A1-A9 at 1 C mA current charge to 3.8 volts. Upon reaching 3.8 volts, charge at constant voltage with a limit of 0.05 C mA current charge and set aside for 5 minutes. Place all batteries into a furnace at 160° C. for 1 hour and make observations of the batteries during that time. If no changes were detected, it was noted as such. In the alternative, if the explosion-proof opening is breached, the time to failure was noted as such. Additionally, the maximum surface temperature of each battery was measured and recorded. The results of the 1 hour furnace test and maximum surface temperature are shown in Table 2.

TABLE 2

Maintenance rate and thickness variations of batteries A1-A9.

| Sample number | Capacity maintenance rate (%) | Thickness variation (mm) | 3 C/0.2 C discharge rate (%) | 5 C/0.2 C discharge rate (%) | 1 hour furnace heat test | Maximum surface temp (° C.) |
|---|---|---|---|---|---|---|
| A1 | 95.2 | 0.04 | 97.5 | 93.5 | No change | 165 |
| A2 | 95.2 | 0.04 | 90.1 | 86.7 | No change | 163 |
| A3 | 88.3 | 0.10 | 98.0 | 84.2 | No change | 162 |
| A4 | 94.4 | 0.06 | 98.4 | 94.0 | No change | 163 |
| A5 | 95.4 | 0.06 | 96.4 | 92.8 | 58 min | 175 |
| A6 | 96.7 | 0.05 | 97.0 | 93.0 | No change | 163 |
| A7 | 95.0 | 0.04 | 95.3 | 90.6 | No change | 168 |
| A8 | 92.5 | 0.07 | 89.1 | 82.5 | 52 min | 175 |
| A9 | 80.5 | 0.13 | 78.9 | 52.7 | 41 min | 182 |

From the results in Table 2, examples A1-A8 exhibited better capacity maintenance rates, less thickness variations, higher discharge rates, and generally better thermal performance including lower maximum surface temperatures than reference A9. Accordingly, the cathode materials and methods of manufacturing same according to the presently disclosed embodiments can provide lithium secondary batteries with enhanced thermal properties, large current charge/discharge cycling capabilities and safety performance.

From the results above, the cathode materials and methods of manufacturing same according to the presently disclosed embodiments can provide lithium secondary batteries with not only enhanced capacity and capacity maintenance rates, but also enhanced current charge/discharge cycle performance, safety performance and high temperature storage performance.

Another embodiment of the present invention calls for a cathode material for lithium ion batteries, wherein the cathode material includes at least two compounds and a binder component. In this embodiment, a first compound A includes one or more salts of lithium metal phosphate while a second compound B includes one or more compound selected from the group including lithium transition metal oxides, acetylene black, superconducting carbon black, conductive graphite and conductive carbon fiber. The first compound A has a median diameter (D50) of about 1 to 6 microns while the second compound B has a D50 of about 4 to 20 microns. The median diameter (D50) is defined as the average particle size of the sample population such that half the particles in the population has diameters smaller than D50 while the other half has diameters larger than D50.

In general, introducing a larger compound B increases the interaction and fluidity of active particles thereby increases the frequency of molecular contact and the associated bond strengths between the active particles and the various molecules. The increased molecular contact can lead to improved electrical conductivity of the cathode active material at the same time. Furthermore, because of superior electrical conductivity exhibited by compound B, the presently disclosed cathode material provides enhanced battery capacity and charge/discharge performance.

In the cathode material mixture, the two compounds A, B and the binder component can have a wide range of ratios and compositions. Using the weight of the lithium metal phosphate salt (first compound A) as a standard, the amount of second compound B that can be added to the mixture is about 1-80% by weight while the weight of the binder component is about 1-15% by weight. In another embodiment, at least one conductive additive may be incorporated.

In one embodiment, the lithium metal phosphate salt can take on the chemical formula: $Li_{1+X}M_YPO_4$ (1), wherein: $-0.1 \leq X \leq 0.2$, $0.9 \leq Y \leq 1.1$, and M includes one or more members of calcium, iron, aluminum, titanium, cobalt, boron, chromium, nickel, magnesium, zirconium, gallium, vanadium, manganese, zinc and other elements. Furthermore, reducing the particle size or D50 of the lithium metal phosphate salt can lead to increased electrical and ion conductivity. As such, a preferred median diameter (D50) of lithium metal phosphate salt is about 1 to 6 microns, although other sizes and dimensions can be contemplated.

Salts of lithium metal phosphates having olivine structures can be highly stable. The phosphorous-oxygen bonds have generally high bond strength and stable chemical structure, and as such, cannot be readily broken nor will they readily dissociate to produce oxygen molecules. Thus, using olivine-structured lithium metal phosphate salts can lead to a safer and more stable cathode material. In one example, the olivine-structured lithium metal phosphate salt can be purchase from a third party vendor or supplier. In the alternative, the olivine-structured lithium metal phosphate salt can be manufactured from known methods of preparation. In addition, other structures of lithium metal phosphate salts can be incorporated.

In one embodiment, the lithium transition metal oxide can take on the chemical formula: $Li_{1+X}Ni_{1-Y-Z}Mn_YCo_ZM_PO_2$, wherein: $-0.1 \leq X \leq 0.2$, $0 \leq Y \leq 1$, $0 \leq Z \leq 1$, $0 \leq Y+Z \leq 1.0$, $0 \leq P \leq 0.2$, and M includes one or more members of boron, magnesium, aluminum, titanium, chromium, iron, zirconium, copper, zinc, gallium, yttrium, fluorine, iodine, sulfur and other elements. In another embodiment, the lithium transitional metal oxide can take on the chemical formula: $Li_{1+X}Mn_YM_{2-Y}O_4$, wherein: $-0.1 \leq X \leq 0.2$, $1.7 \leq Y \leq 2.0$, and M includes one or more members of boron, magnesium, aluminum, titanium, chromium, iron, zirconium, copper, zinc, gallium, yttrium, fluorine, iodine, sulfur, cobalt, nickel and other elements. In specific examples, the lithium transition metal oxide includes one or more members selected from the group including $LiCoO_2$, $LiMn_2O_4$ and $LiNiO_2$.

The binder component includes one or more members of polyvinylidene fluoride (PVDF), polyvinyl alcohol (PVA), polyethylene acid butyral, polyacrylic acid resin, carboxymethyl cellulose (CMC), methyl cellulose, ethyl cellulose, hydroxypropyl methylcellulose (HPMC) and other polymeric material. A binder component with high molecular weight or large polymeric volume can facilitate the bonding process between lithium metal phosphate salt and other large active materials within the mixture. In addition, the binder component can also address bonding concerns between active cathode material particles and other large particles within the mixture thereby enhancing the battery's cycling performance. In this instance, the binder component can be PVDF or polyvinylidene tetrafluoroethylene having molecular weight of about 100000 to 2000000.

The cathode material of the lithium ion battery can also include a current collector or a coated/filled positive current collector with the necessary positive active material. In one example, the cathode material can utilize an aluminum material to function as a positive current collector.

A method of manufacturing a cathode material for lithium ion batteries includes evenly mixing a first compound A, a second compound B, and a binder component. In this embodiment, the first compound A includes one or more salts of lithium metal phosphate while the second compound B includes one or more components selected from the group including lithium transition metal oxides, acetylene black, superconducting carbon black, conductive graphite and conductive carbon fiber. The first compound A has a median diameter (D50) of about 1 to 6 microns while the second compound B has a D50 of about 4 to 20 microns. In general, the particle size of the second component B is larger than the particle size of the first component A.

The cathode material embodiments can be prepared through a variety of means, including coating/mixing the cathode active material with slurries and solvents, filling the cathode active material on current collectors, and drying, cutting, forming and stamping the cathode material into die form. The amount of solvent to provide the proper viscosity and mobility or coating on the current collectors as well as the drying and die forming methods and their processing conditions can be generally appreciated by one skilled in the art. Furthermore, the lithium ion battery can incorporate an anode active material, a dividing membrane and a non-aqueous electrolyte utilizing materials and methods generally known to one skilled in the art. Likewise, the anode active material can include the negative current collector and binder component as understood by one skilled in the art.

A plurality of anode active materials can be incorporated in the lithium ion battery without limitation. For example, the anode active material can include one or more members of natural graphite, artificial graphite, petroleum coke, decomposed organic carbon material, mesocarbon microbeads (MCMB), carbon fiber, tin alloy, metal alloy and silicon alloy. It is understood that other lithium anode active materials can also be incorporated.

Like the cathode material, the anode material can also include one or more conductive additives. In one example, the anode conductive additive includes one or more members of carbon black, acetylene black, furnace black, vapor grown carbon fiber, conductive carbon black and conductive graphite. Using the weight of the anode active material as a standard, the amount of conductive additive that can be added to the anode active material is about 1-15% by weight. It will be appreciated by one skilled in the art that other conductive additives and anode active materials as well as their weight ratios can be incorporated.

The binder component for the anode material can include fluorine-containing resins and polyolefin compounds. In the alternative, the binder component can include one or more members of polyvinylidene fluoride (PVDF), polytetrafluoroethylene (PTFE) and styrene-butadiene rubber (SBR). Using the weight of the anode active material as a standard, the amount of binder component that can be added to the anode active material is about 0.01-8% by weight. In specific examples, the binder component for the anode material can be a mixture of cellulose-based polymer and rubber latex or cellulose-based polymer and SBR, wherein the amount of each material is understood by one skilled in the art. It will also be appreciated that other types of binder components can be incorporated.

The anode active material can also include negative current collectors having stamped metal, metal foil, metal mesh or bubble-shaped metal. In one example, the anode active material can utilize a copper material to function as a negative current collector.

A dividing membrane having enhanced electric insulation properties and the ability to maintain liquidity can be provided between the cathode and anode materials. The dividing membrane should also be capable of being received within the battery core and not be susceptible to the non-aqueous electrolyte. As such, the dividing membrane can take on one or more members of micro-porous polymer film, polypropylene film, polyethylene film and various types of micro-porous multi-layered composite films. It is understood that other types of dividing membrane can be incorporated and that their location and nature can be appreciated by one skilled in the art.

The mixture of non-aqueous electrolyte and non-aqueous solvent can include a plurality of conventional non-aqueous electrolyte. For example, the non-aqueous electrolyte can include one or more members of $LiPF_6$, lithium perchlorate, lithium tetrafluoroborate, lithium hexafluoroarsenate, lithium halide, lithium chloroaluminate and lithium fluoride. The non-aqueous solvent can include organic solvents having chain ester and ring ester mixtures including dimethyl carbonate (DMC), diethyl carbonate (DEC), ethyl methyl carbonate (EMC), methyl propyl carbonate (MPC), dipropyl carbonate (DPC) and mixtures thereof. In addition, other organic ester chains having fluorine, sulfur or unsaturated bonds, cyclic esters including ethylene carbonate (EC), propylene carbonate (PC), vinylene carbonate (VC), γ-butyrolactone (γ-BL), methyl lactone and other organic ester rings having fluorine, sulfur or unsaturated bonds may also be contemplated. The quantity of electrolyte to inject into the battery is generally 1.5 to 4.9 grams/ampere-hour with an electrolyte concentration of 0.5-2.9 mole/liter, although other amounts and concentrations can be incorporated.

The following are examples of cathode materials having at least two compounds and a binder component.

EXAMPLE B1

Mix 3 weight portion of polyvinylidene fluoride (PVDF), 94 weight portion of $LiFePO_4$ with D50 at 3.0 micron, 6 weight portion of $LiCoO_2$ with D50 at 6.0 micron, and 5 weight portion of acetylene black with D50 at 6.0 micron to provide a composite cathode material.

EXAMPLE B2

Mix 3 weight portion of PVDF, 94 weight portion of $LiFePO_4$ with D50 at 1.0 micron, 6 weight portion of $LiMn_2O_4$ with D50 at 18.0 micron, and 5 weight portion of acetylene black with D50 at 6.0 micron to provide a composite cathode material.

EXAMPLE B3

Mix 3 weight portion of PVDF, 94 weight portion of $LiFePO_4$ with D50 at 5.0 micron, 6 weight portion of acetylene black with D50 at 20.0 micron, and 5 weight portion of acetylene black with D50 at 6.0 micron to provide a composite cathode material.

EXAMPLE B4

Mix 3 weight portion of PVDF, 94 weight portion of lithium manganese phosphate with D50 at 6.0 micron, 6 weight portion of conductive graphite with D50 at 8.0 micron, and 5 weight portion of conductive graphite with D50 at 6.0 micron to provide a composite cathode material.

EXAMPLE B5

Mix 3 weight portion of PVDF, 94 weight portion of lithium cobalt phosphate with D50 at 6.0 micron, 6 weight portion of conductive carbon fibers with D50 at 12.0 micron, and 5 weight portion of conductive carbon fiber with D50 at 6.0 micron to provide a composite cathode material.

REFERENCE B6

Mix 3 weight portion of PVDF, 94 weight portion of $LiFePO_4$ with D50 at 3.0 micron, 6 weight portion of $LiCoO_2$ with D50 at 2.0 micron, and 5 weight portion of acetylene black with D50 at 2.0 micron to provide a composite cathode material.

TESTING OF EXAMPLES B1-B5 AND REFERENCE B6

(1) Battery Preparation
(a) Preparation of Cathode Material
Separately disperse each of the cathode materials from examples B1-B5 and reference B6 in 60 weight portion of N-methylpyrrolidone (NMP), thoroughly mix to provide uniform slurries. Apply an even coating of each slurry on a 20 micron thick aluminum foil, dry at 120° C., roll to a thickness of 0.170 mm, and crop to a size of 450×43 mm² to provide about 5.5 grams of composite cathode active ingredient.
(b) Preparation of Anode Material
Dissolve 3 weight portion of PVDF in 60 weight portion of NMP. Add 100 grams of artificial graphite into the solution and thoroughly mix to provide an anode material. Apply an even coating on a 20 micron thick copper foil, dry at 120° C., roll to a thickness of 0.120 mm, crop to a size of 470×45 mm² to provide about 2.5 grams anode active ingredient.
(c) Preparation of Electrolyte
In a volumetric ratio of 1:1:1 mixture of EC:DEC:EMC, dissolve 1M $LiPF_6$ to provide a mixture of non-aqueous electrolyte.
(d) Battery Assembly
Separately insert a 25 micron thick porous polypropylene film between each of the cathode and anode active materials and roll into individual spiral electrode structures. Insert each electrode structure into an aluminum shell, place a lead on the cover, provide 3.5 grams of non-aqueous electrolyte, and seal the shell and cover. Allow the shell to sit at 45° C. for 24 hours so that the cathode, anode and polypropylene films are fully saturated with the non-aqueous electrolyte (70 mA constant current charging for 8 hours) to form 5×34×50 mm³ lithium secondary batteries for testing.
(2) Battery Capacity Testing
Charge each of the batteries B1-B6 at 1 C mA current charge to 3.8 volts. Upon reaching 3.8 volts, charge at constant voltage with a limit of 0.05 C mA current charge and set aside for 5 minutes. Discharge at 1 C mA current charge to 2.0 volts and set aside for 5 minutes. The battery capacities of discharging at 1 C mA current charge to 2.0 volts are shown in Table 3.

TABLE 3

Capacity testing of batteries B1-B6.

| Sample number | Battery capacity (mA) | Battery resistance (MΩ) |
|---|---|---|
| B1 | 730 | 40.2 |
| B2 | 755 | 39.7 |
| B3 | 762 | 39.2 |
| B4 | 735 | 39.6 |
| B5 | 728 | 38.7 |
| B6 | 634 | 50.5 |

From the results in Table 3, examples B1-B5 exhibited increased battery capacity over reference B6 by between 94-128 mA. At the same time, each battery's internal resistance was lower by about 10.3-12.2 MΩ. Accordingly, the cathode materials and methods of manufacturing same according to the presently disclosed embodiments can provide increased capacity and reduced internal resistance.
(3) Large Current Discharge Performance Testing
Charge each of the batteries B1-B6 at 1 C mA current charge to 3.8 volts. Upon reaching 3.8 volts, charge at constant voltage with a limit of 0.05 C mA current charge and set aside for 5 minutes. Discharge at 0.2 C mA current charge to 2.0 volts and set aside for 5 minutes. Record the battery capacities of discharging at 0.2C mA current charge to 2.0 volts. Repeat the steps above at 1 C mA and 3 C mA. Record the battery capacities of discharging at 1 C mA current charge to 2.0 volts and at 3 C mA current charge to 2.0 volts. The battery discharge capacity ratios at different current charges are shown in Table 4.

TABLE 4

Large current discharge performance testing of batteries B1-B6.

| Sample number | 1 C/0.2 C discharge rate (%) | 3 C/0.2 C discharge rate (%) |
|---|---|---|
| B1 | 96.5 | 92.8 |
| B2 | 97.3 | 93.0 |
| B3 | 97.5 | 93.1 |
| B4 | 97.4 | 93.3 |
| B5 | 97.8 | 94.0 |
| B6 | 74.0 | 50.3 |

From the results in Table 4, examples B1-B5 exhibited higher 1 C/0.2 C discharge rates than reference B6 by between 22.5-23.8%. Likewise, examples B1-B5 exhibited higher 3 C/0.2 C discharge rates than reference B6 by between 42.5-43.0%. Accordingly, the cathode materials and methods of manufacturing same according to the presently disclosed embodiments can provide lithium secondary batteries with enhanced large current discharge performance.
(4) Cycle Performance Testing
Charge each of the batteries B1-B6 at 1 C mA current charge to 3.8 volts. Upon reaching 3.8 volts, charge at constant voltage with a limit of 0.05 C mA current charge and set aside for 5 minutes. Discharge at 1 C mA current charge to 2.0 volts and set aside for 5 minutes. Repeat the steps above at least 300 times. After 300 cycles, record the battery capacity of discharging at 1 C mA current charge to 2.0 volts. Table 5 illustrates the battery capacity maintenance rate, which can be determined by comparing the capacity at the end of the multiple cycles versus the initial cycle.

TABLE 5

| Cycle performance testing of batteries B1-B6. | |
| --- | --- |
| Sample number | Battery capacity maintenance rate (%) |
| B1 | 93.5 |
| B2 | 94.7 |
| B3 | 95.5 |
| B4 | 95.2 |
| B5 | 93.8 |
| B6 | 74.6 |

From the results in Table 5, examples B1-B5 exhibited higher battery capacity maintenance rates than reference B6 by between 18.9-20.9%. Accordingly, the cathode materials and methods of manufacturing same according to the presently disclosed embodiments can provide lithium secondary batteries with enhanced cycle performance.

From the results above, the cathode materials and methods of manufacturing same can provide lithium secondary batteries with not only increased capacity and reduced internal resistance, but also with enhanced large current discharge performance and enhanced cycle performance.

Although the invention has been described in detail with reference to several embodiments, additional variations and modifications exist within the scope and spirit of the invention as described and defined in the following claims.

What is claimed is:

1. A cathode material comprising:
a first compound;
a binder component; and
a second compound;
   wherein the second compound comprises a lithium transition metal oxide having a general formula selected from the group consisting of:
   $Li_{1+x}Mn_yM_{2-y}O_4$, wherein: $-0.1 \leq X \leq 0.2$, $1.7 \leq Y \leq 2.0$ and M is selected from the group consisting of boron, magnesium, aluminum, titanium, chromium, iron, zirconium, copper, zinc, gallium, yttrium, fluorine, iodine, sulfur, cobalt, nickel, and combinations thereof; and
   $Li_{1+x}Ni_{1-y-z}Mn_yCo_zM_pO_2$, wherein: $-0.1 \leq X \leq 0.2$, $0 \leq Y \leq 1$, $0 \leq Z \leq 1$, $0 \leq Y+Z \leq 1.0$, $0 < P \leq 0.2$ and M is selected from the group consisting of boron, magnesium, aluminum, titanium, chromium, iron, zirconium, copper, zinc, gallium, yttrium, fluorine, iodine, sulfur, and combinations thereof;
   wherein the average particle size of the second compound is larger than the average particle size of the first compound; and
   wherein, the first compound is a lithium metal phosphate salt having the general formula $Li_{1+x}M_yPO_4$, wherein: $-0.1 \leq X \leq 0.2$, $0.9 \leq Y \leq 1.1$; and M is selected from the group consisting of: calcium, iron, aluminum, titanium, cobalt, boron, chromium, nickel, magnesium, zirconium, gallium, vanadium, manganese, zinc and combinations thereof, and the amount of the first compound ranges from about 51% to about 98% by weight of the total amount of the cathode material.

2. The cathode material according to claim 1, wherein the lithium metal phosphate salt has an average particle size of about 1 to 6 microns.

3. The cathode material according to claim 1, wherein the second compound further includes an additive selected from the group consisting of: acetylene black, superconducting carbon black, conductive graphite, conductive carbon fiber, and combinations thereof.

4. The cathode material according to claim 1, wherein the lithium transition metal oxide includes one or more members selected from the group including $LiCoO_2$, $LiMn_2O_4$ and $LiNiO_2$.

5. The cathode material according to claim 1, wherein the lithium transition metal oxide has an average particle size of about 4 to 20 microns.

6. The cathode material according to claim 1, wherein the binder component includes one or more members of polyvinylidene fluoride (PVDF), polyvinyl alcohol (PVA), polyethylene acid butyral, polyacrylic acid resin, carboxymethyl cellulose (CMC), methyl cellulose, ethyl cellulose, hydroxypropyl methylcellulose (HPMC) and other polymeric material.

7. The cathode material according to claim 1, further comprising at least one conductive additive.

8. A battery comprising a cathode, an anode and an electrolyte, wherein said cathode comprises the material of claim 1.

* * * * *